US012280497B2

(12) United States Patent
Kawata et al.

(10) Patent No.: US 12,280,497 B2
(45) Date of Patent: Apr. 22, 2025

(54) ARM ROBOT

(71) Applicant: KAWASAKI JUKOGYO KABUSHIKI KAISHA, Kobe (JP)

(72) Inventors: Takuya Kawata, Kobe (JP); Masato Yamamoto, Kobe (JP); Norihisa Tatsuta, Kobe (JP); Akinori Takagi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/274,308

(22) PCT Filed: Jan. 28, 2022

(86) PCT No.: PCT/JP2022/003210
§ 371 (c)(1),
(2) Date: Jul. 26, 2023

(87) PCT Pub. No.: WO2022/163789
PCT Pub. Date: Aug. 4, 2022

(65) Prior Publication Data
US 2024/0091928 A1 Mar. 21, 2024

(30) Foreign Application Priority Data
Jan. 28, 2021 (JP) .................. 2021-012191

(51) Int. Cl.
*B25J 9/12* (2006.01)
*B25J 9/10* (2006.01)
*B25J 18/00* (2006.01)

(52) U.S. Cl.
CPC ................. *B25J 9/12* (2013.01); *B25J 9/106* (2013.01); *B25J 18/00* (2013.01)

(58) Field of Classification Search
CPC ..... B25J 9/12; B25J 9/106; B25J 18/00; B25J 17/0258; B25J 9/1025; F16H 49/001
See application file for complete search history.

(56) References Cited

U.S. PATENT DOCUMENTS 5,132,887 A * 7/1992 Torii ..................... B25J 18/04
362/423
8,434,387 B2 * 5/2013 Nakagiri .............. B25J 17/0258
74/665 R (Continued)

FOREIGN PATENT DOCUMENTS

CN 101121264 A * 2/2008 ......... B25J 17/0283
CN 208729826 U * 4/2019
(Continued)

OTHER PUBLICATIONS

Machine translation of CN 208729826 (Year: 2019).*

*Primary Examiner* — Randell J Krug
(74) *Attorney, Agent, or Firm* — Oliff PLC

(57) ABSTRACT

A wrist of an arm robot includes a first motor, a first speed reducer, a second motor, a transmission shaft, and a second speed reducer. The first motor is arranged at a base and generates a first rotational drive force to rotate a first distal portion. The first speed reducer is arranged at the first distal portion, includes a hollow portion, and reduces a rotational speed of the first rotational drive force. The second motor is arranged at the base and generates a second rotational drive force to rotate a second distal portion. The transmission shaft is arranged at the first distal portion and passes through the hollow portion of the first speed reducer. The second speed reducer is arranged at the first distal portion, is arranged coaxial with the first speed reducer, and is arranged along an axial direction of the first speed reducer.

5 Claims, 3 Drawing Sheets

(56) References Cited

U.S. PATENT DOCUMENTS

| | | | | |
|---|---|---|---|---|
| 8,590,415 | B2 * | 11/2013 | Long | B25J 17/0258 |
| | | | | 74/490.06 |
| 8,910,539 | B2 * | 12/2014 | Long | B25J 17/0258 |
| | | | | 901/27 |
| 9,095,982 | B2 * | 8/2015 | Oka | B25J 17/0283 |
| 9,370,866 | B2 * | 6/2016 | Oikawa | B25J 17/0283 |
| 10,513,029 | B2 * | 12/2019 | Krumbacher | B25J 17/0258 |
| 2008/0034920 | A1 * | 2/2008 | Inoue | B25J 9/104 |
| | | | | 901/29 |
| 2011/0252921 | A1 * | 10/2011 | Nakagiri | B25J 9/104 |
| | | | | 74/665 R |
| 2019/0134809 | A1 | 5/2019 | Owa et al. | |
| 2020/0290197 | A1 * | 9/2020 | Inoue | B25J 19/0025 |

FOREIGN PATENT DOCUMENTS

| | | | | |
|---|---|---|---|---|
| CN | 111673715 A * | 9/2020 | | B25J 19/0025 |
| CN | 111872972 A | 11/2020 | | |
| JP | 2008044019 A * | 2/2008 | | B25J 17/0283 |
| JP | 2019-084608 A | 6/2019 | | |
| JP | 2020037178 A * | 3/2020 | | B08B 13/00 |
| JP | 2020146763 A * | 9/2020 | | B25J 19/0025 |

\* cited by examiner

ARM ROBOT

TECHNICAL FIELD

The present application chiefly relates to an arm robot that includes an arm and a wrist.

BACKGROUND ART

PTL 1 discloses a robot that includes an A-arm, a B-arm, and a C-arm. The B-arm is cantilevered by the A-arm. The C-arm is connected to the B-arm. An end effector is attached to the C-arm. The A-arm, the B-arm, and the C-arm are driven separately. A B-motor which drives the B-arm, and a C-motor which drives the C-arm are arranged in the A-arm. The rotational drive force of the B-motor is reduced by a B-speed reducer arranged in the B-arm. The rotational drive force of the C-motor is reduced by a C-speed reducer arranged in the B-arm. The axis of the B-speed reducer coincides with the axis of rotation of the B-arm. The axis of the C-speed reducer coincides with the axis of rotation of the C-arm.

PRIOR-ART DOCUMENTS

Patent Documents

PTL 1: Japanese Patent Application Publication No. 2019-84608

SUMMARY OF THE INVENTION

Problems to be Solved by the Invention

With the configuration disclosed in PTL 1, at least one of the B-arm or the C-arm are likely to become large since the B-speed reducer and the C-speed reducer are arranged with different orientations. The combination of the A-arm, the B-arm, and the C-arm will be referred to as the wrist in the description below.

The present application is made in view of the situation described above, and its main purpose is to provide an arm robot that includes a cantilevered wrist whose distal portion is compact.

Means for Solving the Problems

The problem to be solved by the present application is as described above. The means to solve this problem and the effects thereof will be described below.

An aspect of the present application provides an arm robot with a configuration described below. That is, an arm robot includes an arm and a wrist connected to the arm. The wrist includes a proximal portion, a link, a first distal portion, a second distal portion, a first motor, a first speed reducer, a second motor, a transmission shaft, and a second speed reducer. The proximal portion is connected to the arm. The link extends from the proximal portion toward a distal end. The first distal portion is arranged closer to the distal end than the proximal portion is, cantilevered by the proximal portion through the link, and rotatably attached to the proximal portion. The second distal portion is rotatably connected to the first distal portion and an end effector is attachable to the second distal portion. The first motor is arranged at the proximal portion and generates a first rotational drive force to rotate the first distal portion. The first speed reducer is arranged at the first distal portion, includes a hollow portion, and reduces a rotational speed of the first rotational drive force. The second motor is arranged at the proximal portion and generates a second rotational drive force to rotate the second distal portion. The transmission shaft is arranged at the first distal portion and passes through the hollow portion of the first speed reducer. The second speed reducer is arranged at the first distal portion, is arranged coaxial with the first speed reducer, is arranged along an axial direction of the first speed reducer, reduces a rotational speed of the second rotational drive force that is transmitted via the transmission shaft, and transmits the second rotational drive force to the second distal portion.

This arrangement of the first speed reducer and the second reducer along the axial direction allows a distal portion (a portion that includes the first distal portion and the second distal portion) of the cantilevered wrist to be compact.

Effects of the Invention

According to the present application, an arm robot that includes a cantilevered wrist whose distal portion is compact is provided.

EMBODIMENT FOR CARRYING OUT THE INVENTION

Embodiments of the present application will be described below with reference to the drawings. First, an outline of an arm robot 1 will be described with reference to FIG. 1.

The arm robot 1 is an industrial robot and is installed at a workplace, such as a factory. An end effector 5 is attached to the distal end of the arm robot 1. The arm robot 1 performs a work using the end effector 5. The work performed by the arm robot 1 is, for example, assembly, welding, painting, or cleaning.

The arm robot 1 is a teaching-playback type. The teaching-playback type is a type in which the arm robot 1 is taught how to move and work in advance by an operator, for example, manually, and the arm robot 1 is operated so that the arm robot 1 repeatedly performs the movement and work as taught. The arm robot 1 may be other than the teaching-playback type.

Figure 1:
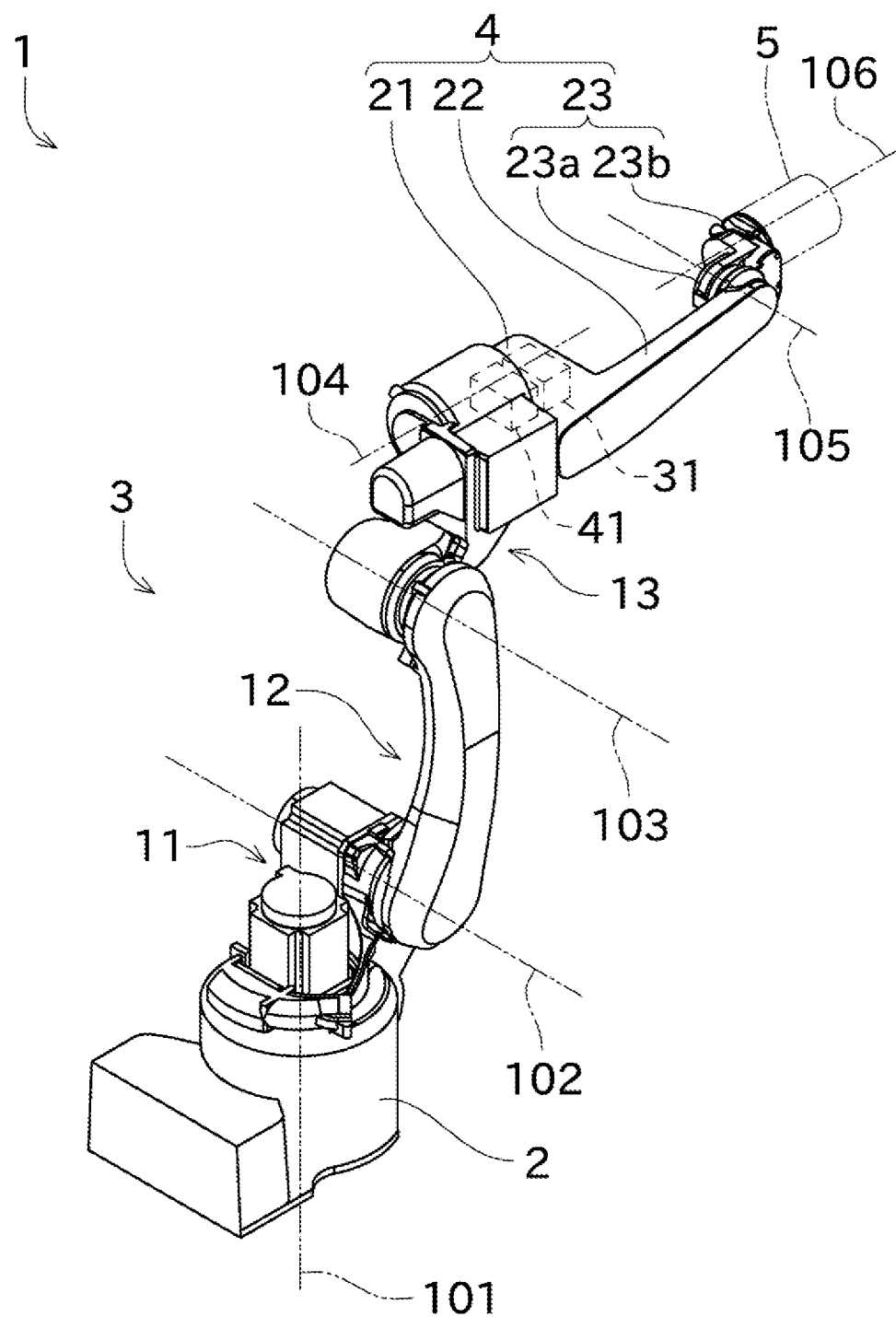
FIG. 1 is a perspective view of an arm robot according to one embodiment of the present application.

As shown in FIG. 1, the arm robot 1 includes a mounting base 2, an arm 3, and a wrist 4. The mounting base 2 is fixed at a suitable position in the workplace, for example, on a floor, on a ceiling, or on a workbench. The proximal end of the arm 3 is connected to the mounting base 2 and the distal end of the arm 3 is connected to the wrist 4. The proximal end of the wrist 4 is connected to the arm 3 and the end effector 5 is attachable to the distal end of the wrist 4.

The arm 3 includes a first movable part 11, a second movable part 12, and a third movable part 13. The first movable part 11 is rotatably connected to the mounting base 2. The first movable part 11 can relatively rotate with respect to the mounting base 2 with a first rotational axis 101 as the center of rotation. The second movable part 12 is rotatably connected to the first movable part 11. The second movable part 12 can relatively rotate with respect to the first rotational axis 101 (the first movable part 11) with a second rotational axis 102 as the center of the rotation. The first rotational axis 101 and the second rotational axis 102 are perpendicular to each other. The third movable part 13 is rotatably connected to the second movable part 12. The third movable part 13 can relatively rotate with respect to the second movable part 12 with a third rotational axis 103 as the center of the rotation. The third rotational axis 103 is perpendicular to the first rotational axis 101 and is parallel to the second rotational axis 102.

The arm robot 1 includes motors and each of the motors drives the first movable part 11, the second movable part 12, or the third movable part 13. The arm 3 includes encoders and each of the encoders detects amount of rotation of the first movable part 11, the second movable part 12, or the third movable part 13.

The wrist 4 includes a proximal portion 21, a link 22, and a distal portion 23. The proximal portion 21 is rotatably connected to the arm 3 (the third movable part 13). The proximal portion 21 can be relatively rotated with respect to the arm 3 (the third movable part 13) by a rotational drive force generated by a motor that is not shown in the drawings with a fourth rotational axis 104 as the center of the rotation. A first motor 31 and a second motor 41 are arranged inside the proximal portion 21.

The link 22 connects the proximal portion 21 and the distal portion 23. The distal portion 23 is cantilevered by the proximal portion 21 through the link 22. More precisely, the link 22 is connected to only one end of the proximal portion 21 in a predetermined direction (in the present embodiment, a direction perpendicular to the fourth rotational axis 104, specifically a direction parallel to a fifth rotational axis 105) and similarly, the link 22 is connected to only one end of the distal portion 23 in a predetermined direction. Note that a configuration with both ends support is a configuration where one end of the proximal portion 21 is connected to one end of the distal portion 23 by a link, and the other end of the proximal portion 21 is connected to the other end of the distal portion 23 by a link. The distal portion 23 being cantilevered allows the wrist 4 to be compact.

The distal portion 23 is relatively rotated with respect to the proximal portion 21 and the link 22 by the first rotational drive force generated by the first motor 31 with the fifth rotational axis 105 as the center of the rotation. The transmission of the first rotational drive force will be described below.

The distal portion 23 includes a first distal portion 23a and a second distal portion 23b. The first distal portion 23a is located closer to the proximal end than the second distal portion 23b is. Thus, the first distal portion 23a is rotatably connected to the link 22. The second distal portion 23b is rotatably connected to the first distal portion 23a. The second distal portion 23b relatively rotates with respect to the first distal portion 23a by the second rotational drive force generated by the second motor 41 with a sixth rotational axis 106 as the center of the rotation. The transmission of the second rotational drive force will be described below.

The fourth rotational axis 104 and the sixth rotational axis 106 are parallel to each other. In the present embodiment, they coincide with each other. The fifth rotational axis 105 is perpendicular to the fourth rotational axis 104 (the sixth rotational axis 106). The amounts of rotation of each member of the wrist 4 are also detected by encoders that are not shown in the drawings.

As described above, the arm robot 1 of the present embodiment is a six-axis vertically articulated type. The number of joints or the orientations of the rotational axes may be different from that in the present embodiment.

Figure 2:
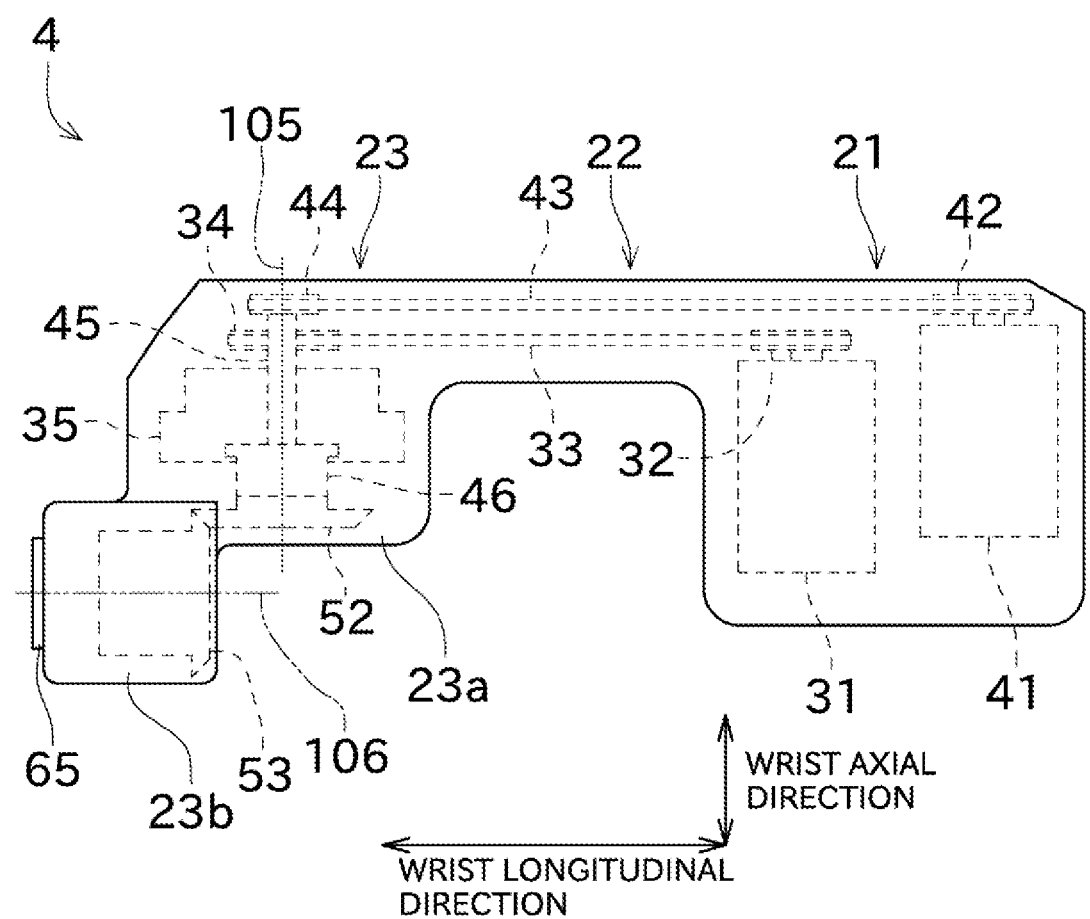
FIG. 2 is a side view of a wrist.

Then, an outline of the configuration of the wrist 4, especially the transmission of the first rotational drive force and the second rotational drive force will be described with reference to FIG. 2.

As described above, the first motor 31 is arranged in the proximal portion 21. A first proximal-end pulley 32 is attached to the output shaft of the first motor 31. A first belt 33 is wrapped around the first proximal-end pulley 32. The first belt 33 passes through the link 22 and transmits the first rotational drive force to the distal portion 23.

A first distal-end pulley 34 and a first speed reducer 35 are arranged in the distal portion 23 (the first distal portion 23a). The first distal-end pulley 34 and the first speed reducer 35 are coaxial. The word coaxial is used to indicate that the positions of the axes of the members (positions of straight lines passing through the center of circular members) are the same. The first belt 33 is wrapped around the first distal-end pulley 34. The first distal-end pulley 34 is connected to the first speed reducer 35 in such a way that the first rotational drive force can be transmitted. A hollow portion is formed around the position where the axis of the first speed reducer 35 is located. The first speed reducer 35 reduces the rotational speed of the transmitted first rotational drive force.

With this configuration, the first rotational drive force transmitted to the distal portion 23 is transmitted to the first speed reducer 35 via the first distal-end pulley 34. The first speed reducer 35 is connected to a base part (a rotary base 64, which is described below) for rotating the distal portion 23 in such a way that the first rotational drive force can be transmitted. This allows the distal portion 23 to rotate at a speed that is lowered by the first speed reducer 35.

As described above, the second motor 41 is arranged in the proximal portion 21. A second proximal-end pulley 42 is attached to the output shaft of the second motor 41. A second belt 43 is wrapped around the second proximal-end pulley 42. The second belt 43 passes through the internal space of the link 22 and transmits the second rotational drive force to the distal portion 23.

The first motor 31 and the second motor 41 are arranged in a line along the longitudinal direction of the wrist 4 (a wrist longitudinal direction). The wrist longitudinal direction is a direction in which the proximal portion 21 and the distal portion 23 are connected and is parallel to, for example, the fourth rotational axis 104 or the sixth rotational axis 106. This configuration allows the length of the link 22 to be reduced, thus increasing rigidity. In the present embodiment, the first motor 31 is arranged closer to the distal end than the second motor 41. The first motor 31 may be arranged closer to the proximal end than the second motor 41.

A direction perpendicular to the wrist longitudinal direction and parallel to the fifth rotational axis 105 is referred to as a wrist axial direction. The positions of the first motor 31 and the second motor 41 in the wrist axial direction are slightly different. Thus, the positions of the first belt 33 and the second belt 43 in the wrist axial direction are different. This prevents interference between the first belt 33 and the second belt 43. The positions of the first motor 31 and the second motor 41 in the wrist longitudinal direction may be the same. In this case, for example, a power transmission member may be used to offset the position of the first belt 33 or the second belt 43.

A second distal-end pulley 44, a transmission shaft 45, and a second speed reducer 46 are arranged in the distal portion 23 (the first distal portion 23a). The second distal-end pulley 44, the transmission shaft 45, and the second speed reducer 46 are coaxial. They are also coaxial with the first distal-end pulley 34 and the first speed reducer 35. The second belt 43 is wrapped around the second distal-end pulley 44. The second distal-end pulley 44 is connected to one end of the transmission shaft 45 in such a way that the second rotational drive force can be transmitted. The transmission shaft 45 is arranged to pass through the hollow portion of the first speed reducer 35. The other end of the transmission shaft 45 is connected to the second speed reducer 46 in such a way that the second rotational drive force can be transmitted. The second speed reducer 46 reduces the rotational speed of the second rotational drive force.

With this configuration, the second rotational drive force transmitted to the distal portion 23 is transmitted to the second speed reducer 46 via the second distal-end pulley 44 and the transmission shaft 45. The second speed reducer 46 is connected to a first gear member 52 in such a way that the second rotational drive force can be transmitted. The first gear member 52 and a second gear member 53 that meshes with the first gear member 52 are configured as bevel gears and they transmit the second rotational drive force changing its direction by 90 degrees. The second gear member 53 is connected to a portion of the second distal portion 23b (an end effector attaching part 65, which rotates integrally with the end effector 5) in such a way that the second rotational drive force can be transmitted. This allows the second distal portion 23b to rotate at a speed that is lowered by the second speed reducer 46.

In the present embodiment, the first speed reducer 35 and the second speed reducer 46 are arranged in the wrist axial direction. This allows effective use of space and the distal portion 23 to be compact in the wrist axial direction. As a result, it is possible to reduce the radius of rotation of the wrist 4 rotated with the fourth rotational axis 104 as the center of the rotation.

Furthermore, in the present embodiment, when viewed in a direction perpendicular to the axial direction (that is, in FIG. 2), the first speed reducer 35 and the second speed reducer 46 overlap. In other words, the first speed reducer 35 is located in the hollow portion of the second speed reducer 46 as well as the transmission shaft 45 is. This configuration makes the distal portion 23 even more compact in the wrist axial direction. The configuration in which the first speed reducer 35 and the second speed reducer 46 overlap is not an essential feature. The first speed reducer 35 and the second speed reducer 46 may be separated when viewed in the direction perpendicular to the axial direction.

In the present embodiment, the positions of the first motor 31 and the second motor 41 in the height direction (a direction along the first rotational axis 101) are approximately the same. In other words, the first motor 31 and the second motor 41 overlap when viewed in the direction along the fourth rotational axis 104. If the positions of the first motor 31 and the second motor 41 in the height direction were different, the size of the proximal portion 21 in the height direction would be larger. Furthermore, since the positions of the first proximal-end pulley 32 and the second proximal-end pulley 42 in the height direction are also different, the paths of the first belt 33 and the second belt 43 may become V-shaped and the size of the link 22 in the height direction may also become larger. In contrast, in the present embodiment, the positions of the first motor 31 and the second motor 41 in the height direction are substantially the same, so the sizes of the proximal portion 21 and the link 22 in the height direction can be compact.

Figure 3:
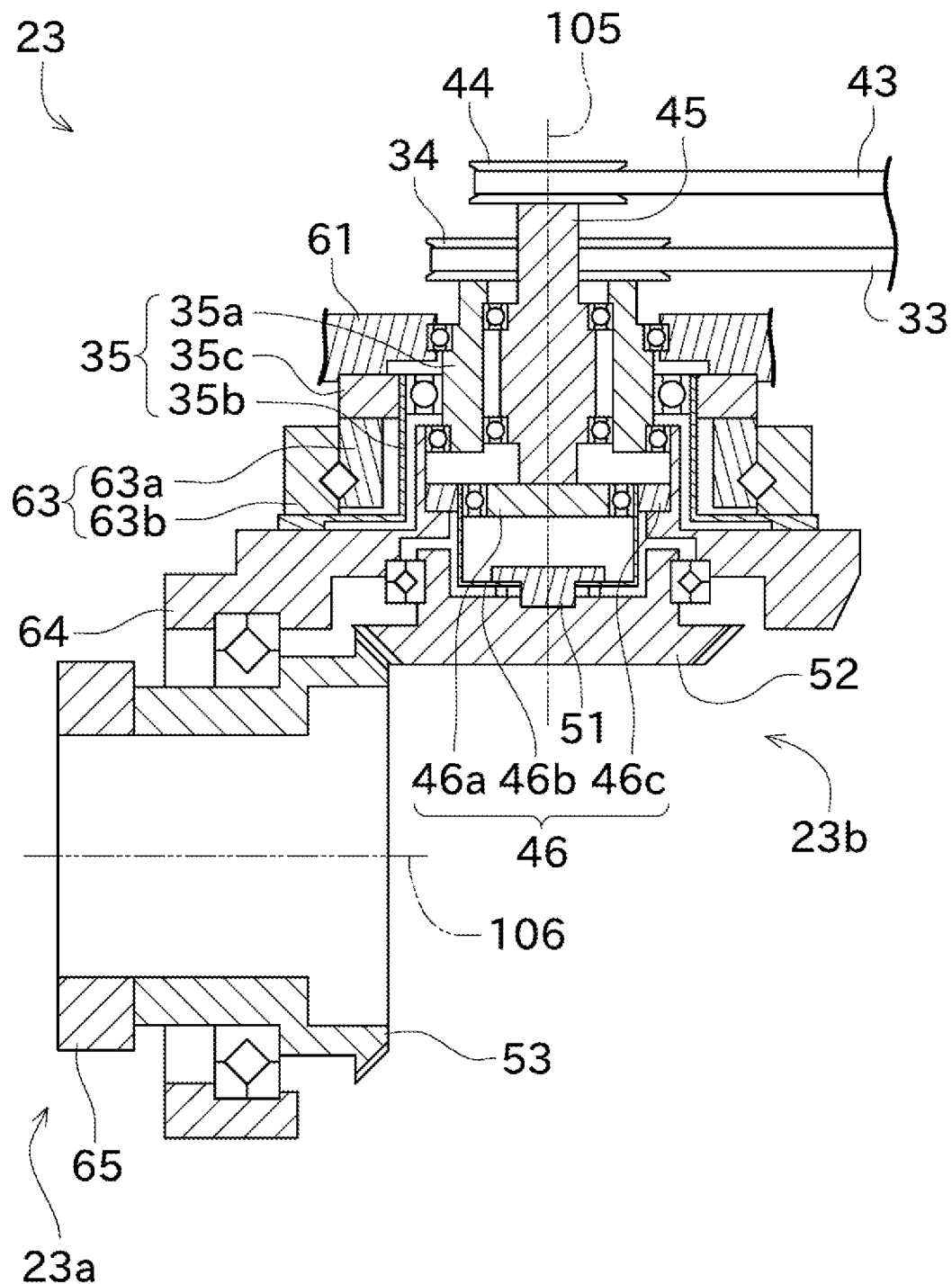
FIG. 3 is a cross-sectional view showing power transmission at a distal portion of a wrist.

Then, the configuration for transmitting the first rotational drive force and the second rotational drive force will be described in detail below with reference to FIG. 3.

First, the configuration for transmitting the first rotational drive force will be described. As described above, the first rotational drive force generated by the first motor 31 is transmitted to the first speed reducer 35 via the first belt 33 and the first distal-end pulley 34. The first speed reducer 35 includes a strain wave gearing system and comprises an input member (a wave generator) 35a, an output member (a flex spline) 35b, and a fixed member (a circular spline) 35c.

The input member 35a is a component which is comprised of a bearing combined with the outer periphery of an elliptical cam. A through hole is formed in the center of the elliptical cam (at and near the portion through which the fifth rotational axis 105 passes), forming a hollow portion. The inner ring of the bearing is fixed to the elliptical cam, while the outer ring is elastically deformed with balls. The input member 35a is fixed to the first distal-end pulley 34 by bolts or other suitable means. The input member 35a and the first distal-end pulley 34 integrally rotate together.

The output member 35b is a component that is substantially cylindrical. The output member 35b is open at and near its center, thus forming a hollow portion. The output member 35b is thin-walled (for example, thinner than the input member 35a and the fixed member 35c) and is easily elastically deformed. One end of the output member 35b in the axial direction (in FIG. 3, the top end) contacts the outer ring of the bearing of the input member 35a. Therefore, the output member 35b deforms into an elliptical shape by receiving force from the input member 35a. One end of the output member 35b in the axial direction (in FIG. 3, the top end, or the end closer to the second distal portion 23b) also contacts the fixed member 35c. Specifically, teeth that are formed on the outer periphery of the output member 35b mesh with teeth on the inner periphery of the fixed member 35c. The other end of the output member 35b in the axial direction (in FIG. 3, the bottom end) is flanged (widened in the radial direction).

The fixed member 35c is a ring-shaped component and has teeth formed on its inner periphery. The number of the teeth on the inner periphery of the fixed member 35c is larger than the number of the teeth on the outer periphery of the output member 35b by a predetermined number (for example, two). The output member 35b is fixed to a casing member 61 of the distal portion 23 in such a way that the output member 35b cannot relatively rotate.

As described above, the input member 35a, the output member 35b, and the fixed member 35c are all open at and near their centers, so that a hollow portion is formed in the first speed reducer 35.

Since the strain wave gearing system is well known to the public, the principle of deceleration will be briefly described below. That is, the output member 35b is elastically deformed into an elliptical shape by the input member 35a. At this time, at the ends of the major axis of the elliptically deformed output member 35b, the teeth of the output member 35b and the fixed member 35c are meshed, and, at the ends of the minor axis of the output member 35b, the teeth of the output member 35b and the fixed member 35c separate. Thus, by rotating the input member 35a, the positions where the teeth meshed gradually change. When the input member 35a rotates 360 degrees in a first direction, the output member 35b rotates in a second direction (the opposite direction of the first direction) by an amount that corresponds to the difference in the number of the teeth between the output member 35b and the fixed member 35c.

Thus, the rotational speed that is input to the input member 35a can be lowered and output from the output member 35b.

The rotary base 64 and a crossed roller baring 63 are arranged at the distal portion 23.

The rotary base 64 is a member that supports components of the distal portion 23 (for example, the second distal portion 23b and a component that transmits the second rotational drive force to the second distal portion 23b) that relatively rotate with respect to the members such as the casing member 61.

The crossed roller bearing 63 connects a component fixed to a member such as the casing member 61 and a component that relatively rotates with respect to a member such as the casing member 61. Specifically, the crossed roller bearing 63 includes an inner ring 63a and an outer ring 63b. The inner ring 63a is fixed to the casing member 61 via the fixed member 35c so that the inner ring 63a cannot relatively rotate with respect to the casing member 61. The outer ring 63b is fixed to the rotary base 64 together with the flange portion of the output member 35b so that the outer ring cannot relatively rotate with respect to the rotary base 64. In other words, the outer ring 63b, the output member 35b, and the rotary base 64 can integrally rotate together. With the above configuration, the distal portion 23 can be rotated with the fifth rotational axis 105 as the center of rotation with the first rotational drive force reduced.

Next, the configuration for transmitting the second rotational drive force will be described below. As described above, the second rotational drive force generated by the second motor 41 is transmitted to the transmission shaft 45 via the second belt 43 and the second distal-end pulley 44. The transmission shaft 45 is arranged to pass through the hollow portion of the first speed reducer 35 that is described above. Specifically, the transmission shaft 45 passes through the portion where the input member 35a, the output member 35b, and the fixed member 35c overlap. The distal end of the transmission shaft 45 (the end closer to the second distal portion 23b) is located more proximally than the flanged portion of the output member 35b is. In other words, a portion of the second speed reducer 46 is located inside the hollow portion of the output member 35b of the first speed reducer 35. Thus, in the drawing viewed in the direction perpendicular to the axial direction (FIG. 3), the first speed reducer 35 and the second speed reducer 46 overlap.

The second speed reducer 46 includes a strain wave gearing system and comprises an input member (a wave generator) 46a, an output member (a flex spline) 46b, and a fixed member (a circular spline) 46c. The configuration and principle for the second speed reducer 46 reducing the second rotational speed is the same as that for the first speed reducer 35, so the description of them is omitted here.

The transmission shaft 45 is fixed to the input member 46a by bolts or the like in such a way that the transmission shaft 45 cannot relatively rotate with respect to the input member 46a. The output member 46b is not cylindrical, but is cup-shaped with a bottom. The first gear member 52 is fixed to the bottom of the output member 46b via the connector 51 in such a way that the first gear member 52 cannot relatively rotate with respect to the output member 46b. The fixed member 46c is fixed to the rotary base 64 by bolts or the like in such a way that the fixed member 46c cannot relatively rotate with respect to the fixed member 46c.

This allows the first gear member 52 to rotate at a rotational speed lowered by the second speed reducer 46. As described above, the first gear member 52 meshes with the second gear member 53 and the connector 51 and the first gear member 52 are configured as bevel gears. The end effector attaching part 65 is fixed to the second gear member 53 by bolts or the like in such a way that the end effector base 65 cannot relatively rotate with respect to the gear member 53.

With the above configuration, the second distal portion 23b can be rotated with the sixth rotational axis 106 as the center of rotation with the second rotational drive force reduced.

As explained above, the arm robot 1 of the present embodiment includes the arm 3 and the wrist 4 connected to the arm 3. The wrist 4 includes the proximal portion 21, the link 22, the first distal portion 23a, the second distal portion 23b, the first motor 31, the first speed reducer 35, the second motor 41, the transmission shaft 45, and the second speed reducer 46. The proximal portion 21 is connected to the arm 3. The link 22 extends from the proximal portion 21 toward the distal end. The first distal portion 23a is arranged closer to the distal end than the proximal portion 21 is, cantilevered the proximal portion 21 through the link 22, and rotatably attached to the proximal portion 21. The second distal portion 23b is rotatably connected to the first distal portion 23a and an end effector 5 is attachable to the second distal portion 23b. The first motor 31 is arranged at the proximal portion 21 and generates the first rotational drive force to rotate the first distal portion 23a. The first speed reducer 35 is arranged at the first distal portion 23a, includes a hollow portion, and reduces the rotational speed of the first rotational drive force. The second motor 41 is arranged at the proximal portion 21 and generates the second rotational drive force to rotate the second distal portion 23b. The transmission shaft 45 is arranged at the first distal portion 23a and passes through the hollow portion of the first speed reducer 35. The second speed reducer 46 is arranged at the first distal portion 23a, is arranged coaxial with the first speed reducer 35, is arranged along the axial direction of the first speed reducer 35, reduces the rotational speed of the second rotational drive force that is transmitted via the transmission shaft 45, and transmits the second rotational drive force to the second distal portion 23b.

This arrangement of the first speed reducer 35 and the second speed reducer 46 along the axial direction allows the distal portion 23 of the cantilevered wrist 4 to be compact.

In the arm robot 1 of the present embodiment, at least a portion of the second speed reducer 46 is arranged in the hollow portion of the first speed reducer 35, and the first speed reducer 35 and the second speed reducer 46 overlap when viewed in a direction perpendicular to the axial direction.

This allows the first speed reducer 35 and the second speed reducer 46 to be more aggregately arranged so that the distal portion 23 of the wrist 4 can be even more compact.

In the arm robot 1 of the present embodiment, the first motor 31 and the second motor 41 are arranged in the wrist longitudinal direction.

This allows the size of the proximal portion 21 in the height direction to be more compact compared to a configuration in which the first motor 31 and the second motor 41 are arranged in a line along the height direction.

While the preferred embodiment of the present application has been described above, the configurations explained above may be modified, for example, as follows.

In the above embodiment, both of the first speed reducer 35 and the second speed reducer 46 include the strain wave gearing system, but they may be speed reducers with a different configuration.

In the above embodiment, the positions of the first motor 31 and the second motor 41 in the height direction are substantially the same, but they may be significantly different.

The invention claimed is:

1. An arm robot, comprising an arm and a wrist connected to the arm,
wherein the wrist comprises:
a proximal portion that is connected to the arm;
a link that extends from the proximal portion toward a distal end;
a first distal portion that is arranged closer to the distal end than the proximal portion, cantilevered by the proximal portion through the link, and rotatably attached to the proximal portion;
a second distal portion that is rotatably connected to the first distal portion and to which an end effector is attachable to;
a first motor that is arranged at the proximal portion and generates a first rotational drive force to rotate the first distal portion;
a first speed reducer that is arranged at the first distal portion, includes a hollow portion, and reduces a rotational speed of the first rotational drive force;
a second motor that is arranged at the proximal portion and generates a second rotational drive force to rotate the second distal portion;
a transmission shaft that is arranged at the first distal portion and passes through the hollow portion of the first speed reducer;
a second speed reducer that is arranged at the first distal portion, is arranged coaxial with the first speed reducer, reduces a rotational speed of the second rotational drive force that is transmitted via the transmission shaft, and transmits the second rotational drive force to the second distal portion;
a first gear member arranged in the first distal portion that is connected to the second speed reducer; and
a second gear member arranged in the second distal portion that is connected to the first gear member, the second gear member being perpendicular to the first gear member,
wherein the first speed reducer, the second speed reducer, and the first gear member are arranged in that order, from proximal to distal, along a direction parallel to a length the transmission shaft, and
the transmission shaft is connected to an input side of the second reducer and passes through the hollow portion of the first reducer.

2. The arm robot according to claim 1, wherein at least a portion of the second speed reducer is arranged in the hollow portion of the first speed reducer, and the first speed reducer and the second speed reducer overlap when viewed in a direction perpendicular to the axial direction.

3. The arm robot according to claim 2, wherein, when a longitudinal direction of the link is referred to as a wrist longitudinal direction, the first motor and the second motor are arranged in the wrist longitudinal direction.

4. The arm robot according to claim 1, wherein, when a longitudinal direction of the link is referred to as a wrist longitudinal direction, the first motor and the second motor are arranged in the wrist longitudinal direction.

5. The arm robot according to claim 1, wherein:
at least a portion of the second speed reducer is arranged in the hollow portion of the first speed reducer,
both the first speed reducer and the second speed reducer are arranged in the first distal portion, and
the first speed reducer and the second speed reducer overlap when viewed in a direction perpendicular to the axial direction.

* * * * *